United States Patent [19]

Ono et al.

[11] Patent Number: 4,489,117
[45] Date of Patent: Dec. 18, 1984

[54] SUPER HIGH DENSITY MAGNETIC RECORDING MEDIUM

[75] Inventors: Masaaki Ono, Omihachiman; Masahiko Motegi, Hikone; Kazuo Okabe, Shiga, all of Japan

[73] Assignee: Toray Industries, Inc., Tokyo, Japan

[21] Appl. No.: 413,125

[22] Filed: Aug. 30, 1982

[30] Foreign Application Priority Data

Sep. 1, 1981 [JP] Japan .............................. 56-136139
Oct. 12, 1981 [JP] Japan .............................. 56-160962

[51] Int. Cl.³ .................. H01F 10/04; G11B 5/64; G11B 5/78
[52] U.S. Cl. .................................. 428/147; 360/134; 427/128; 427/132; 428/141; 428/145; 428/149; 428/152; 428/201; 428/447; 428/450; 428/457; 428/480; 428/481; 428/483; 428/694; 428/900
[58] Field of Search ............... 428/447, 481, 483, 480, 428/694, 900, 141, 145, 147, 149, 152, 695, 201, 450, 457; 528/275, 286; 427/128, 132; 360/134

[56] References Cited

U.S. PATENT DOCUMENTS 4,106,948  8/1978  Cooper .............................. 428/447
4,233,352  11/1980 Ono ................................. 428/480
4,367,262  1/1983  Vaughn ............................ 428/480

FOREIGN PATENT DOCUMENTS

115663 of 1973 Japan.
2087302A 5/1982 United Kingdom.

Primary Examiner—Ellis P. Robinson
Attorney, Agent, or Firm—Austin R. Miller

[57] ABSTRACT

A super high density magnetic recording medium is provided, which comprises a polyester film and a discontinuous film formed on at least one surface of the polyester film. The discontinuous film has a thickness of smaller than 500 angstroms and is composed mainly of a water-soluble polymer, a silane coupling agent, and if desired, a silicone resin. A high density magnetic recording medium is also provided, which comprises a ferromagnetic metal thin film formed on the discontinuous film layer of the polyester base film. The polyester base film is especially suitable for formation of a metallized video tape, and this tape is excellent in the slip characteristics and abrasion resistance and advantageous in that noises and drop-out are reduced.

40 Claims, 4 Drawing Figures

SUPER HIGH DENSITY MAGNETIC RECORDING MEDIUM

BACKGROUND OF THE INVENTION (1) Field of the Invention

The present invention relates to a base film for a magnetic recording medium. More particularly, it relates to a base film suitable for a super high density magnetic recording medium.

(2) Description of the Prior Art

With an increase of the recording density in the magnetic recording medium, the surface smoothness required for a polyester film used for the recording medium is increased. On the other hand, in order to improve the operation adaptability at the film-forming step or the magnetic tape-preparing step, slip characteristics are required for the surface of the film. Moreover, the slipness of the magnetic tape is crucial. Namely, it is required for a polyester base film suitable for a magnetic recording medium to have excellent smoothness and good slip characteristics.

As means for satisfying these requirements, there has been adopted a method in which fine particles are incorporated in the starting polymeric material for formation of a smooth film. However, according to this conventional technique, if one of the smoothness and the slip characteristics is improved, the other property is degraded, and it has heretofore been impossible to improve both the properties simultaneously.

A conventional magnetic recording tape is of the so-called coating type, which is prepared by coating a base film with a magnetic paint comprising a magnetic powder and an organic polymer binder, and the coating layer has a relatively large thickness, i.e., ordinarily 3 to 6μ. Accordingly, it seldom happens that the convexities and concavities on the surface of the base film are reproduced in the magnetic layer to cause drastic reduction of the electromagnetic performances. Therefore, in the conventional base film for the magnetic recording medium, a method has been employed wherein finely divided particles are incorporated in the starting polymeric material or inner particles are formed in the starting polymeric material from the polymerization catalyst residue, whereby slip characteristics are imparted to the film.

However, this magnetic recording medium of the coating type does not satisfy the recent requirement of realizing a super high magnetic recording density. Accordingly, a so-called metallized film tape having a highly magnetic, thin metal surface layer formed by vacuum evaporation or sputtering without the use of a binder has become popular as a super high recording density video tape instead of the magnetic recording medium of the coating type.

The thickness of the magnetic metal layer of the above-mentioned metallized film tape is usually 0.05 to 0.2μ, namely, much thinner than that in the magnetic tape of the coating type. Therefore, the surface configuration of the base film used is completely reproduced on the surface of the metallized film tape. Accordingly, if the surface roughness of the base film is large, the electromagnetic performances of the metal thin-film video tape is extremely reduced. In fact, even if a metal thin-film video tape formed from a finely divided particle-incorporated base film is used in a VTR (video tape recorder), no image is reproduced, namely, this tape cannot be used as a video tape at all.

In view of the electromagnetic performances, a base film having quite a smooth surface is preferred, but practically, the following problem arises with such a smooth surface film. More specifically, a vacuum-deposited metal film formed on a base film having quite a smooth surface is inferior in slip characteristics of the surface, and therefore, unless, for example, a protecting film layer is formed thereon, many scratches are inevitably produced on the surface of the vacuum-deposited metal film by contact with various guide pins, heads and the like in the tape-forming process after the vacuum evaporation step or during the use thereof in a video tape recorder.

As a base film for the high density magnetic recording medium in which the foregoing defect is eliminated, reduction of the electromagnetic performances is minimized and the slip characteristics are improved, we previously proposed in U.S. Pat. No. 4,233,352 a polyester film having on at least one surface thereof a discontinuous film formed of worm-like nodules composed of a mixture of a water-soluble polymer and a polysiloxane or styrene-butadiene rubber. The above-mentioned problem has been substantially solved by this proposal and a good image can be reproduced even when a metallized film is used as a video tape.

We furthered our researches on base films of this type, and found that another problem arises at the step of forming a metallized film video tape. Namely, it was found that by abrupt elevation of the temperature of the base film, oligomers ooze out from the interior of the polyester film and are precipitated on the film surface. When the oligomers are precipitated, the surface smoothness is degraded by the solid particles of the oligomers and bad influences are imposed on the electromagnetic performances of the metallized film tape. Moreover, when the size of the oligomer particles is too large, it is impossible to perform the vacuum deposition and such defects as pinholes are formed, and there is a risk of exposure of the oligomer particles on the surface of the metallized film. The resulting magnetic tape is liable to exhibit undesirably increased drop-out number. Moreover, accordingly, after formation of a magnetic tape, a problem of drop-out arises. Moreover, the slip characteristics and abrasion resistance of the film tend to be readily varied in a broad temperature range, and if the film is exposed to a high temperature at the vacuum deposition step or the like, the slip characteristics are drastically reduced, and the strength and abrasion resistance of the film are reduced.

SUMMARY OF THE INVENTION

It is a primary object of the present invention to provide a polyester film in which the foregoing defects are eliminated and which exhibits excellent slip characteristics and abrasion resistance over a broad temperature range.

Another object of the present invention is to provide a base film for a magnetic recording medium, on which a vacuum-deposited metal film exhibiting excellent smoothness, slip characteristics, scratch resistance and resistance to precipitation of oligomers can be formed.

A further object of the present invention is to provide a super high density magnetic recording medium having a ferromagnetic metal thin film layer excellent in the slip characteristics, scratch resistance and electromagnetic performances, which is formed on the surface.

A still further object of the present invention is to provide a video tape of the metallized film type suitable for a small video tape recorder (VTR) and a base film therefor.

More specifically, in accordance with the present invention, there is provided a polyester film for a magnetic recording medium comprising a polyester film and a discontinuous film formed on at least one surface of said polyester film, said discontinuous film having a thickness of not larger than 500 angstroms and comprised of a water-soluble polymer and a silane coupling reagent, preferably together with a silicone resin.

Furthermore, there is provided a super high density magnetic recording medium comprising a ferromagnetic metal thin film formed on the above-mentioned discontinuous film of said polyester film.

DESCRIPTION OF THE PREFERRED EMBODIMENTS

A biaxially oriented film is preferable as the polyester film used in the present invention. In view of the mechanical characteristics, it is preferable that a biaxially oriented polyester film of the balanced type, a further uniaxially tensilized polyester film and a further biaxially tensilized polyester film be used. It is preferable that the surface of the polyester film used be smooth. More specifically, it is preferable that the surface roughness of the polyester film be such that when the cut-off value of a stylus-type surface roughness tester is 0.08 mm, the value Ra is not more than $0.015\mu$, especially 0.010 to $0.002\mu$.

The $R_a$ value is subjected to the aforementioned cut-off to eliminate longer waviness and to differentiate true roughness. The $R_a$ value may be obtained by using a stylus-type surface tester. The $R_a$ value is the arithmetic mean of the absolute values of the heights or depths of the surface roughness curve obtained by eliminating a certain amount of waviness from the profile curve by adopting a proper cut-off value from the center line, which is obtained by leveling the roughness curve's mountains and valleys. (DIN 4768). In effect, average roughness is determined by measuring the areas under the roughness waves for a given test length and then dividing by the length.

The polyester used for the preparation of the base film is not particularly critical, so far as it is composed mainly of a linear polyester. As typical instances, there can be mentioned polyethylene terephthalate, polytetramethylene terephthalate, poly-1,4-cyclohexylenedimethylene terephthalate, polyethylene 2,6-naphthalene-dicarboxylate and polyethylene p-hydroxybenzoate. Among these polyesters, polyethylene terephthalate is especially preferable.

The polyester may be either a homopolyester or a copolyester. As the comonomers to be copolymerized with the monomers of the above-listed polyesters for the preparation of the copolyesters, there can be mentioned diol components such as diethylene glycol, propylene glycol, neopentyl glycol, polyethylene glycol, p-xylylene glycol and 1,4-cyclohexane dimethanol, dicarboxylic acid components such as adipic acid, sebacic acid, phthalic acid, isophthalic acid, 2,6-naphthalene-dicarboxylic acid and 5-sodium sulfoisophthalate; polyfunctional dicarboxylic acid components such as trimellitic acid and pyromellitic acid; and p-hydroxyethoxybenzoic acid. It is preferable that the amount of these comonomers used for the copolymerization be up to 20 mole %.

Internal particles formed by the polymerization catalyst residue or inactive particles externally added, which form protrusions on the film surfaces when the polyester film is drawn, may be contained in the polyester, so far as the objects of the present invention are attained. The content of these particles is such that when the polymer is biaxially oriented into a thickness of not more than $30\mu$, the haze of the formed film be not more than 5%.

In the present invention, the discontinuous film is formed of a composition comprising as main components a water-soluble polymer and a silane coupling reagent, preferably together with a silicone resin.

A water-soluble polymer having a molecular weight of 10,000 to 2,000,000, especially 100,000 to 1,000,000, is preferably used. If the molecular weight of the water-soluble polymer is lower than 10,000, the film becomes soft, the structure becomes difficult to retain, and the abrasion resistance tends to become poor. If the molecular weight of the water-soluble polymer is higher than 2,000,000, the film is too rigid and becomes brittle, and the abrasion resistance tends to become poor. As such water-soluble polymers, there can be mentioned polyvinyl alcohol, tragacanth gum, gum arabic, casein, gelatin, methyl cellulose, hydroxyethyl cellulose and carboxymethyl cellulose. Among these polymers, cellulose type water-soluble polymers such as methyl cellulose, hydroxyethyl cellulose and carboxymethyl cellulose are preferable.

As the silane coupling reagent, there is used an organic silicon monomer having in the molecule at least two different reactive groups. As one reactive group, there can be mentioned methoxy, ethoxy and silanol groups, and as the other reactive group, there can be mentioned vinyl, epoxy, methacryl, amino and mercapto groups. The reactive groups used are selected from those which are capable of being linked with the side chain and terminal groups of the water-soluble polymer and further with the side chain and terminal groups of the silicone resin in some case and with the polyester. Ordinarily, a mono-organo-alkoxysilane or di-organo-alkoxysilane is used as the silane coupling reagent. As specific examples, there can be mentioned vinyltrichlorosilane, vinyltriethoxysilane, vinyl-tris($\beta$-methoxyethoxy)silane, $\gamma$-glycidoxypropyltrimethoxysilane, $\gamma$-methacryloxypropyltrimethoxysilane, N-$\beta$-(amino-ethyl)-$\gamma$-aminopropyltrimethoxysilane, N-$\beta$-(aminoethyl)-$\gamma$-aminopropylmethyldimethoxysilane, $\gamma$-chloropropyltrimethoxysilane, $\gamma$-mercaptopropyltrimethoxysilane and $\gamma$-aminopropyltriethoxysilane.

Among these silane coupling reagents, amino-silane type compounds are preferable.

The water-soluble polymer [A] and the silane coupling reagent [B] are ordinarily used in such amounts that the [A]/[B] weight ratio is in the range of from 200/2 to 10/50, preferably from 100/1 to 100/10. The silane coupling reagent exerts the function of intensifying the bondage between the polyester and the water-soluble polymer, and by dint of the presence of the silane coupling reagent, precipitation of the polyester oligomers on the film surface is suppressed and, also the abrasion resistance of the discontinuous film is enhanced. If the amount of the silane coupling reagent is below the above range, the resistance to precipitation of the oligomers is often degraded. If the amount of the silane coupling reagent exceeds the above range, the discontinuous film is liable to become too rigid, and be easily scratched and become brittle.

In order to further improve the slip characteristics and scratch resistance of the discontinuous film of the present invention, it is preferable that a silicone resin be incorporated in the discontinuous film-forming constituents.

In the present invention, a polysiloxane is preferably used as the silicone resin. Particularly, a polysilicone, the main chain of which is represented by the following formula:

wherein $R_1$ stands for a methyl group, a phenyl group or a hydrogen atom, $R_2$ stands for a methyl group, a phenyl group, a hydrogen atom, an epoxy group, an amino group or a hydroxyl group and n is a number of from 100 to 7,000,
and contains epoxy, amino, hydroxyl or other functional groups as the terminal groups, is preferably used. The silicone resin need not indispensably be a homopolymer, but a copolymer or a blend of two or more of homopolymers may be used.

It is preferable that the molecular weight of the silicone resin be 30,000 to 300,000. If the molecular weight of the silicone resin is lower than 30,000, the discontinuous film is too soft and the structure is liable to be readily deformed. If the molecular weight of the silicone resin is higher than 300,000, the film is apt to become brittle.

In order to further improve the slip characteristics of the discontinuous film, a wax may be incorporated in the film-forming composition. As the wax, there may be used insect wax, spermaceti, carnauba wax and bees wax.

The water-soluble polymer [A], the silane coupling reagent [B] and the silicone resin [C] are used preferably in such amounts that the [A]:[B]:[C] weight ratio is in the range of (10-300):(2-50):(10-100), more preferably (50-250): (5-30):(20-80). When the wax [D] is incorporated, it is preferable that the four ingredients are used in such amounts that the [A]:[B]:[C]:[D] weight ratio be in the range of (10-300):(2-50):(10-100):(5-200).

The shape of the discontinuous film is not particularly critical, but it is preferable that the discontinuous film should have a net-like shape or a node-broken net-like shape.

The discontinuous film of the present invention can be observed by using an electron microscope (10,000 magnifications).

Figure 1:
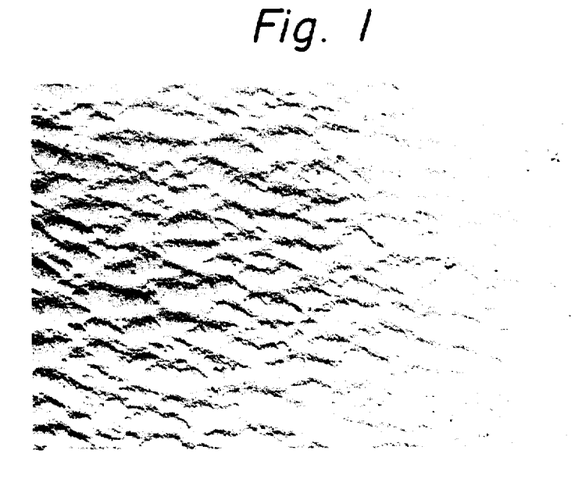
FIG. 1 is an electron photomicrograph (10,000 magnifications) of the surface of the polyester film according to the present invention.
Figure 2:
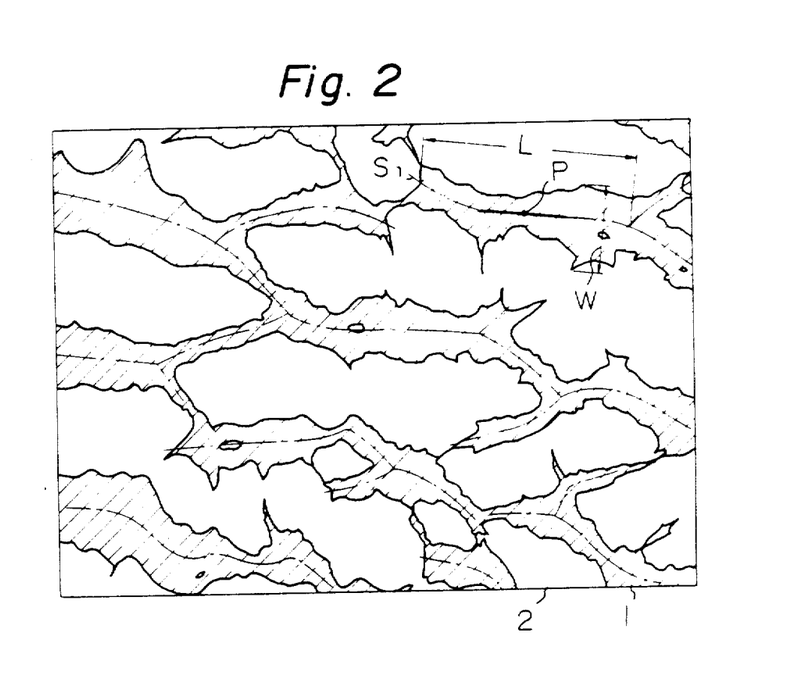
FIG. 2 is an enlarged model diagram illustrating the surface of the polyester film according to the present invention.

FIG. 1 is an electron photomicrograph of the surface of the film of the present invention on which a net-like discontinuous film is formed, and FIG. 2 is a simulating diagram of FIG. 1. In FIG. 2, reference numerals 1 and 2 represent a discontinuous film and an area not covered with the discontinuous film, respectively.

Figure 3:
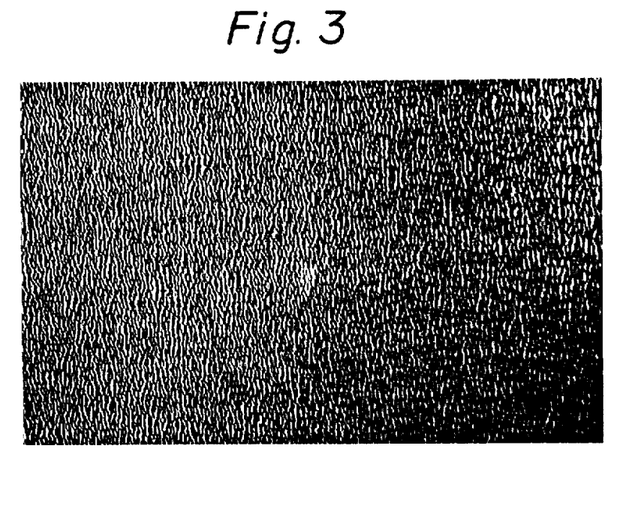
FIG. 3 is a photomicrograph of the surface of the film according to the present invention, which is obtained by using a differential interference microscope.

A photomicrograph of the discontinuous film of the present invention obtained by using a differential interference optical microscope (300 magnifications) is shown in FIG. 3 for further illustration of the structure of the discontinuous film.

The discontinuous film of the present invention has a net-like shape and/or a node-broken net-libe shape. The thickness of the discontinuous film is not larger than 500 angstroms, and it is ordinarily 50 to 500 angstroms and preferably 50 to 300 angstroms. In the discontinuous film, the length of the short axis is ordinarily 0.05 to 10μ and preferably 0.1 to 5μ, and the ratio of the length of the long axis to the length of the short axis is preferably at least 1.7. The ratio of the area occupied by the discontinuous film on the surface of the film, that is, the area fraction of the discontinuous film, is 10 to 90%, preferably 30 to 80%. If the area fraction is within this range, reduction of the S/N ratio in a regenerated signal or the drop-out is not caused and the abrasion resistance is maintained at a high level.

In the present invention, it is preferable that the discontinuous film be composed mainly of a net-like film. The discontinuous film is formed on at least one surface, preferably both the surfaces, of the polyester film.

Figure 4:
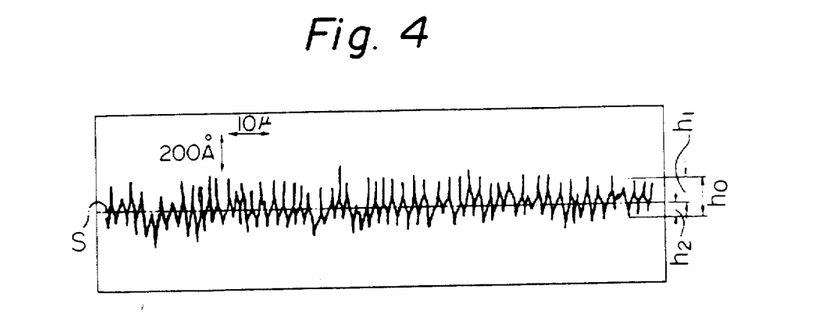
FIG. 4 is a diagram simulating a curve of the surface roughness obtained by measuring the thickness of the discontinuous film at 500,000 magnifications in the perpendicular direction by a stylus-type surface roughness tester.

FIG. 4 shows a curve obtained by measuring the roughness of the surface, on which the discontinuous film of the present invention is formed, at 500,000 magnifications in the perpendicular direction by a stylus-type surface roughness tester. In FIG. 4, the average height between the peak and the valley indicates the thickness of the discontinuous film.

A process for the preparation of a film having a discontinuous film formed thereon according to the present invention will now be described, though the present invention is not limited by this preparation process at all.

An aqueous solution or aqueous emulsion containing the water-soluble polymer and the silane coupling reagent, if necessary together with the silicone resin, is coated and dried on at least one surface of a uniaxially oriented smooth film. The coated film is oriented in the direction perpendicular to the initial orientation direction and, if necessary, the film is further oriented in the same direction as the initial orientation direction. The oriented film is then heat-treated. A specific embodiment will now be described with reference to polyethylene terephthalate. In an ordinary film-forming machine, polyethylene terephthalate is melt-extruded at 260° to 300° C., cooled to 10° to 30° C. and then uniaxially oriented at 120° to 160° C. at a draw ratio of 3 to 5. At the subsequent step preceding to the pre-heating and orienting step, an aqueous solution or aqueous dispersion comprising the water-soluble polymer and the silane coupling agent, if necessary together with the silicone resin, is coated on at least one surface of the uniaxially oriented film, that is, the longitudinally oriented film, according to an optional coating method. It is preferable that the film-forming coating composition be applied in an amount of 3 to 1,000 mg/m² expressed in terms of the solids for one surface. Then, the longitudinally oriented film coated with the film-forming coating composition is oriented in the transverse direction. In order to form the coating film completely before this transverse orientation, it is necessary to completely evaporate water contained in the coating composition applied to the film surface. This evaporation is accomplished by pre-heating the film by hot air maintained at 100° to 150° C. at a water evaporation rate of 5 to 100%/sec in a stenter pre-heating zone of a biaxially drawing machine. After the pre-heating treatment, the film is oriented in the transverse direction at a temperature of 90° to 120° C. at a draw ratio of 2.5 to 4.5. A discontinuous film structure is thus formed on the surface of the film adherently by the transverse orientation conducted after completion of evaporation of water and formation of the coated film. This discontinuous film structure imparts slip characteristics to the resulting film. Then, the transversely oriented film may be heat-treated at 180° to 220° C., or the transversely oriented film may be again longitudinarily oriented at a draw ratio of 1.1 to 1.8 and is then heat-treated at 180° to 220° C., whereby a biaxially oriented polyester film having a discontinuous film having a thickness of less than 500 angstroms, which is formed on at least one surface, is obtained.

For formation of a super high density recording medium, for example, a video tape or the like, a ferromagnetic thin film is formed on the discontinuous film of the so-obtained polyester base film. The ferromagnetic thin film used in the present invention is a thin film composed of a ferromagnetic substance such as Fe, Co or Ni, or an alloy formed entirely or mainly of such ferromagnetic substance. The thickness of the ferromagnetic thin film is not particularly critical in the present invention, but it is preferable that the thickness be in the range of 500 to 2,000 angstroms.

For formation of a thin film of a ferromagnetic substance or an alloy of a ferromagnetic substance and a non-magnetic substance on the base film having the discontinuous film, a vacuum deposition method or a sputtering method may ordinarily be adopted.

A super high density magnetic recording medium of the present invention, for example, a super high recording density type video tape or video disc can be prepared by cutting the so-obtained high density magnetic recording medium into a desired width or shape.

As will be apparent from the foregoing description, a discontinuous film comprising a water-soluble polymer and a silane coupling reagent is formed on the surface of a polyester film adherently in the present invention, whereby the slip characteristics and scratch resistance of a vacuum-deposited thin metal film to be formed on the discontinuous film are improved and precipitation of the oligomers on the film surface is minimized. Moreover, since the thickness of the discontinuous film is smaller than 500 angstroms, it does not make poor electromagnetic performances of the metallized film tape. Accordingly, the film of the present invention is advantageously used for the production of a super high density magnetic recording medium, especially a video tape for small size VTR.

In the present invention, evaluation of the resistance of the base film to precipitation of the oligomers is made by causing the film to stand at 150° C. for 30 minutes and examining an oligomers precipitated on the film surface by an optical microscope.

In connection with a magnetic tape formed by forming a ferromagnetic thin film on the base film, at first, the surface of the tape is observed to check formation of scratches caused in the production process. Recording and reproduction are repeated by using a commercially available VTR of the VHS system. The tape is subjected to the running operation for reproduction 100 times repeatedly, and the surface of the tape is examined to check whether or not scratches are formed on the tape surface.

The S/N ratio is determined by recording a 50% white level signal at an optimum recording current for the tape to be tested and comparing the ratio of the signal to the noise contained in a video demodulation signal at the time of reproduction with that of a commercially available tape of the VHS system as 0 dB.

The drop-out characteristic is determined by recording a three-staged step wave at an optimum recording current on the magnetic recording tape to be tested, counting the number of drop-out in which the attenuation quantity of the video output at the time of reproduction is larger than 18 dB and the duration time is at least 20 microseconds and calculating a mean value per minute.

The terms used in the instant specification will now be explained.

(1) Short and Long Axes of Discontinuous Film:

As shown in FIG. 2, a central line S (one-dot chain line) is drawn at the center of the ridge portion of the discontinuous film, and the width of the broadest portion of the ridge as measured in the direction perpendicular to the central line is defined as the short axis length W.

However, when this central line is drawn, the central line is supposed to be drawn in advance and the width of broad ridges are measured. Three largest values are selected and a mean value is determined as a mean maximum value. If a branched ridge has a smaller width than this mean maximum value, the central line is drawn neglecting this branched ridge. In the case where a circular dent having a diameter not larger than ⅓ of the mean maximum value is present in the ridge, the central line is drawn neglecting this dent.

The linear distance between two closest points among the diverging points of the central line and the points where the central line intersects the ridge end is defined as the long axis length L.

(2) Area Ratio of Discontinuous Film:

The area ratio is a value defined according to the following formula:

$$\frac{So - Sn}{So} \times 100$$

wherein So stands for the area of the visual field for observation, and Sn stands for the area of the portion where the discontinuous film is not formed.

(3) Thickness of Discontinuous Film:

The surface roughness of the discontinuous film-formed surface of the base film is measured at 500,000 magnifications using 0.08 mm cut off value in the direction perpendicular to the film surface using a stylus-type surface roughness tester, and a roughness curve is obtained (see FIG. 4).

A mean value h1 of the height is calculated with respect to 30 peaks present above the center line S, and a mean value h2 of the depth is calculated with respect to 30 valleys below the center line. The sum ho (=h1+h2) of the mean values h1 and h2 is defined as the thickness of the film.

The present invention will now be described in detail with reference to the following Examples.

EXAMPLE 1

A substantially unoriented amorphous polyethylene terephthalate substantially free of internal particles derived from the polymerization catalyst residue was melt-extruded on a rotary drum maintained at about 20° C. and was then drawn in the longitudinal direction at about 130° C. at a draw ratio of 3. Then, both the surfaces of the film were coated with an aqueous solution comprising 0.2% by weight of methyl cellulose and 0.05% by weight of N-$\beta$-(aminoethyl)-$\gamma$-aminopropylmethyldimethoxysilane (silane coupling reagent) so that the coated amount was 50 mg/m$^2$ as the solid. The coated film was passed through a stenter to effect preheating at 100° C. and then, drawn in the transverse direction at a draw ratio of 3.0. Then, the film was heat-treated at 200° C. to obtain a biaxially oriented polyester film having a thickness of 12$\mu$ and having a net-like discontinuous film formed on each surface at an area ratio of 62%. The net-like discontinuous film had a thickness of 350 angstroms, a short axis length of 0.7$\mu$ and a long axis length/short axis length ratio of 4.5, and the long axis was oriented in the machine direction.

A cobalt-iron alloy thin film having a thickness of 1500 angstroms was formed on one surface of the polyester film by vacuum evaporation, and the resulting metallized film was cut along the longitudinal direction in a predetermined width to form a magnetic tape. The properties of this magnetic tape are shown in Table 1.

EXAMPLE 2

A biaxially oriented polyester base film having a thickness of 12$\mu$ was prepared in the same manner as described in Example 1 except that the same aqueous solution as used in Example 1 was applied so that the coated amount was 35 mg/m$^2$ as solids and pre-heating and drawing were carried out while maintaining the temperature in the stenter at 100° C. The discontinuous film formed on each surface had a thickness of 250 angstroms, a short axis length of 0.6$\mu$, a long axis length/short axis length ratio of 4.4 and an area ratio of 60%, and the long axis was oriented in the machine direction.

A metallized film tape was prepared in the same manner as described in Example 1 by using this base film. The properties of the tape are shown in Table 1.

EXAMPLE 3

A biaxially oriented polyester base film having a thickness of 12$\mu$ was prepared in the same manner as described in Example 2 except that an aqueous emulsion formed by adding 0.40% by weight of an epoxidized polydimethylsiloxane emulsion (having a solid concentration of 20% by weight) to the aqueous solution used in Example 2 was used as the coating composition. The discontinuous film formed on each surface had a thickness of 260 angstroms, a short axis length of 0.6$\mu$, a long axis length/short axis length ratio of 4.4 and an area ratio of 62%, and the long axis was oriented in the machine direction.

A metallized film tape was prepared in the same manner as described in Example 1 by using this base film. The properties of the tape are shown in Table 1.

EXAMPLE 4

A biaxially oriented polyester base film having a thickness of 12$\mu$ was prepared in the same manner as described in Example 3 except that SiO$_2$ particles having a particle size of 2$\mu$ were added in an amount of 0.005% by weight to the polyester. The discontinuous film formed on each surface had a thickness of 260 angstroms, a short axis length of 0.6$\mu$, a long axis length/short axis length ratio of 4.4 and an area ratio of 62%, and the long axis was oriented in the machine direction.

A magnetic tape was prepared in the same manner as described in Example 1 by using this base film. The properties of the tape are shown in Table 1.

COMPARATIVE EXAMPLE 1

A biaxially oriented polyester base film having a thickness of 12$\mu$ was prepared in the same manner as described in Example 3 except that the methyl cellulose concentration was varied to 0.30% by weight and the coated amount was varied to 60 mg/m$^2$. The dicontinuous film formed on each surface had a thickness of 600 angstroms, a short axis length of 0.6$\mu$, a long axis length/short axis length ratio of 4.4 and an area ratio of 65%, and the long axis was preferentially oriented in the machine direction.

A metallized magnetic thin film was formed on the so-obtained base film by vacuum deposition in the same manner as described in Example 1. The film was cut in the machine direction to form a magnetic tape. The properties of the tape are shown in Table 1. From the data shown in Table 1, it will readily be understood that no good results are obtained when the thickness of the discontinuous film is larger than 500 Å.

COMPARATIVE EXAMPLE 2

A biaxially oriented polyester base film having a thickness of 12$\mu$ was prepared in the same manner as described in Example 1 except that no silane coupling reagent was incorporated in the coating solution. The discontinuous film formed on each surface had a thickness of 350 angstroms, a short axis length of 0.7$\mu$, a long axis length/short axis length ratio of 4.5 and an area ratio of 62%, and the long axis was oriented in the machine direction.

A metallized magnetic thin film was formed on the base film by vacuum evaporation in the same manner as described in Example 1, and the resulting film was cut in the machine direction to form a magnetic tape. The properties of the tape are shown in Table 1.

TABLE 1

| | Surface Configuration of Base Film | | | | | Resistance of Base Film to Precipitation of Oligomers* | Tape Appearance (Scratches on Tape)** | Properties of Tape | | |
|---|---|---|---|---|---|---|---|---|---|---|
| | Discontinuous Film Structure | | | | | | | | | |
| | Thickness (Å) | Short Axis Length (μ) | Long Axis Length/Short Axis Length Ratio | Area Ratio (%) | Surface Roughess Ra (μ) | | | Scratch Resistance*** | S/N Ratio (dB) | Drop-out Characteristic (number per minute) |
| Example 1 | 350 | 0.7 | 4.5 | 62 | 0.007 | A | B | B | +10 | 25 |
| Example 2 | 250 | 0.6 | 4.4 | 60 | 0.007 | A | B | B | +15 | 25 |
| Example 3 | 260 | 0.6 | 4.4 | 62 | 0.007 | A | A-B | B | +20 | 10 |
| Example 4 | 260 | 0.6 | 4.4 | 62 | 0.010 | A | A-B | A-B | +5 | 30 |
| Comparative Example 1 | 600 | 0.6 | 4.4 | 65 | 0.007 | A | A-B | A-B | −10 | 60 |
| Comparative Example 2 | 350 | 0.7 | 4.5 | 62 | 0.007 | B | C | B | −15 | 280 |

Note
*the heating test was carried out at 150° C. for 30 minutes and the film surface was examined by an optical microscope (200 magnifications).
A: Little or no precipitation of oligomer
B: Precipitation of large amount of oligomer
**The appearance of the tape was evaluated according to the following rating.
A: No scratches observed
B: Small scratches observed
C: Slight formation of scratches observed
D: Prominent formation of scratches observed
***The scratch resistance was evaluated according to the folowing rating.
A: No scratches observed
B: Small scratches observed
C: Slight formation of scratches observed
D: Prominent formation of scratches observed From the data shown in Table 1, it will readily be understood that the discontinuous film structure composed of the water-soluble polymer and silane coupling reagent according to the present invention is excellent in the resistance to precipitation of the oligomers. Furthermore, formation of scratches is minimized at the base film-forming step and the metallized film tape-preparing step. If the silicone resin is incorporated in the discontinuous film structure, formation of scratches is further controlled. When a ferromagnetic thin film is formed on the surface of the polyester base film of the present invention on which a discontinuous film having a thickness of 50 to 500 angstroms, a short axis length of 0.05 to 10μ and a long axis length/short axis length ratio of at least 1.7 is formed at an area raio of 10 to 90%, an excellent magnetic recording medium can be obtained which is characterized in that scratches are not formed on the thin film when the magnetic tape is actually used and the electromagnetic performance is highly improved.

We claim:

1. A super high density magnetic recording medium, which comprises a coated polyester film and a ferromagnetic metal thin film formed on the coated surface of the coated polyester film, said coated polyester film comprising:

(A) a linear polyester film; and
(B) a discontinuous film formed on at least one surface of the linear polyester film, said discontinuous film having a net-like shape and/or a node-broken net-like shape and a thickness of not larger than 500 angstroms, and being applied to said linear polyester base film (A) over an area which is 10 to 90% of the area of said linear polyester base film (A), said discontinuous film (B) comprising:
(i) a water-soluble polymer having a molecular weight of 10,000 to 2,000,000 and
(ii) a silane coupling reagent.

2. A super high density magnetic recording medium as set forth in claim 1, wherein the discontinuous film comprises a silicone resin in addition to the water-soluble polymer and the silane coupling reagent, said silicone resin being polysiloxane having a molecular weight of 30,000 to 300,000.

3. A super high density magnetic recording medium as set forth in claim 1 or 2, wherein the thickness of the discontinuous film is in the range of 50 to 500 angstroms.

4. A super high density magnetic recording medium as set forth in claim 1, or 2, wherein the discontinuous film has a thickness of 50 to 500 angstroms, a short axis length of 0.05 to 10μ and a long axis length/short axis length ratio of at least 1.7.

5. A super high density magnetic recording medium as set forth in claim 1 or 2, wherein the thickness of the discontinuous film is in the range of 50 to 300 angstroms.

6. A super high density magnetic recording medium as set forth in claim 1, wherein the weight ratio of the water-soluble polymer to the silane coupling reagent is in the range of (10–200):(2–50).

7. A super high density megnetic recording medium as set forth in claim 1, wherein the weight ratio of the water-soluble polymer to the silane coupling reagent is in the range of 100:(1–10).

8. A super high density magnetic recording medium as set forth in claim 2, wherein the water-soluble polymer:silane coupling reagent:silicone resin weight ratio is in the range of (10–300):(2–50):(10–100).

9. A super high density magnetic recording medium as set forth in claim 2, wherein the water-soluble polymer:silane coupling reagent:silicone resin weight ratio is (50–250):(5–30):(20–80).

10. A super high density magnetic recording medium as set forth in claim 1 or 2, wherein the discontinuous film has a net-like shape.

11. A super high density magnetic recording medium as set forth in claim 1 or 2, wherein the discontinuous film has a node-broken net-like shape.

12. A super high density magnetic recording medium as set forth in claim 1 or 2, wherein the polyester base film is a smooth polyester film having a surface roughness value Ra of not larger than 0.015μ at a cut-off value of 0.08 mm as measured by a stylus-type surface roughness tester.

13. A super high density magnetic recording medium as set forth in claim 1 or 2, wherein the polyester base film is a smooth polyester film having a surface roughness value Ra of 0.010 to 0.002μ at a cut-off value of 0.08 mm as measured by a stylus-tape surface tester.

14. A super high density magnetic recording medium as set forth in claim 1 or 2, wherein the discontinuous film is formed on both the surfaces of the polyester base film.

15. A super high density magnetic recording medium as set forth in claim 1 or 2, wherein the polyester is at least one polyester selected from the group consisting of polyethylene terephthalate, polytetramethylene terephthalate, poly-1,4-cyclohexylenedimethylene terephthalate, polyethylene 2,6-naphthalenedicarboxylate, polyethylene p-hydroxybenzoate and copolymers thereof.

16. A super high density magnetic recording medium as set forth in claim 1 or 2, wherein the polyester base film is polyethylene terephthalate.

17. A super high density magnetic recording medium as set forth in claim 1 or 2, wherein the water-soluble polymer is a water-soluble polymer having a molecular weight of 100,000 to 1,000,000.

18. A super high density magnetic recording medium as set forth in claim 1 or 2, wherein the water-soluble polymer is at least one member selected from the group consisting of polyvinyl alcohol, tragacanth gum, gum arabic, casein, gelatin, methylcellulose, hydroxethyl cellulose and carboxymethyl cellulose.

19. A super high density magnetic recording medium as set forth in claim 1 or 2, wherein the water-soluble polymer is at least one member selected from the group consisting of methyl cellulose, hydroxyethyl cellulose and carboxymethyl cellulose.

20. A super high density magnetic recording medium as set forth in claim 1 or 2, wherein the silane coupling reagent is an organic silicon monomer having at least two different reactive groups in the molecule.

21. A super high density magnetic recording medium as set forth in claim 1 or 2, wherein the silane coupling reagent is a mono- or di-organoalkoxysilane.

22. A super high density magnetic recording medium as set forth in claim 20, wherein one of the reactive groups is selected from the group consisting of methoxy, ethoxy and silanol groups and the other reactive group is selected from the group consisting of vinyl, epoxy, methacryl, amino and mercapto groups.

23. A super high density magnetic recording medium as set forth in claim 1 or 2, wherein the silane coupling reagent is an aminosilane type compound.

24. A super high density magnetic recording medium as set forth in claim 1, 2, 35 or 37 wherein the silane coupling reagent is at least one organic silane compound selected from the group consisting of vinyltrichlorosilane, vinyltriethoxysilane, vinyl-tris(β-methoxyethoxy)silane, γ-chloropropyltrimethoxysilan and γ-mercaptopropyltrimethoxysilane.

25. A super high density magnetic recording medium as set forth in claim 2, wherein the silicone resin is a compound having a structure represented by the following formula:

wherein $R_1$ stands for a methyl group, a phenyl group or a hydrogen atom, $R_2$ stands for a methyl group, a phenyl group, a hydrogen atom, an epoxy group, an amino group or a hydroxyl group, and n is a number of from 100 to 7,000, and containing functional terminal groups selected from the group consisting of epoxy, amino and hydroxyl groups.

26. A super high density magnetic recording medium as set forth in claim 1 or 2, wherein the polyester base film is a biaxially oriented polyester film.

27. A super high density magnetic recording medium as set forth in claim 1 or 2, wherein the poylester base film is a biaxially oriented polyester film which is tensilized in at least one of the longitudinal direction and the transverse direction.

28. A super high density magnetic recording medium as set forth in claim 1 or 2, wherein the polyester base film is a biaxially tensilized polyester film.

29. A super high density magnetic recording medium as set forth in claim 1, wherein the ferromagnetic metal thin film is a vacuum-deposited ferromagnetic metha thin film.

30. A super high density magnetic recording medium as set forth in claim 1, wherein the thickness of the ferromagnetic metal thin film is in the range of 500 to 2,000 angstroms.

31. A super high density magnetic recording medium as set forth in claim 1, wherein the ferromagnetic metal is at least one member selected from the group consisting of Fe, Co, Ni and alloys thereof.

32. A super high density magnetic recording medium as set forth in claim 1, or 2, wherein the silane coupling reagent is at least one organic silane compound selected from the group consisting of γ-glycidoxypropyltrimethoxysilane, γ-methacryloxy propyltrimethoxysilane, N-β-(aminoethyl)-γ-aminopropyltrimethoxysilane, N-β-(aminoethyl)-γ-aminopropyl methyldimethoxysilane, and γ-aminopropyltriethoxysilane.

33. A super high density magnetic recording medium, which comprises a coated polyester film and a ferromagnetic metal thin film formed on the coated surface of the coated polyester film, said coated polyester film comprising:
  (A) a linear polyester base film; and
  (B) a discontinuous film formed on at least one surface of the base film, said discontinuous film having a net-like shape and/or a node-broken net-like shape and a thickness of not larger than 500 angstroms, and being applied to said polyester base film (A) over an area which is 10 to 90% of the area of said polyester base film (A), said discontinuous film, (B) comprising:
    (i) a water-soluble polymer having a molecular weight of 10,000 to 2,000,000; and
    (ii) a silane coupling reagent operative and effective to bond said base film (A) to said discontinuous film (B).

34. A super high density magnetic recording medium, which comprises a coated polyester film and a ferromagnetic metal thin film formed on the coated surface of the coated polyester film, said coated polyester film comprising:

(A) a linear polyester base film; and
(B) a discontinuous film formed on at least one surface of the base film, said discontinuous film having a net-like shape and/or a node-broken net-like shape and a thickness of not larger than 500 angstroms, and being applied to said polyester base film (A) over an area which is 10 to 90% of the area of said polyester base film (A), said discontinuous film (B) comprising:
  (i) a water-soluble polymer having a molecular weight of 10,000 to 2,000,000; and
  (ii) a silane coupling reagent comprising an organic silicon monomer having in the molecular at least two different reactive groups, at least one of which is capable of linking with the water soluble polymer and at least one of which is capable of linking with the polyester.

35. The super high density magnetic recording medium as claimed in claim 34, wherein one reactive group of said silane coupling reagent is selected from the group consisting of methoxy, ethoxy and silanol groups and another reactive group is selected from the group consisting of vinyl, epoxy, methacryl, amino and mercapto groups.

36. A super high density magnetic recording medium, which comprises a coated polyester film and a ferromagnetic metal thin film formed on the coated surface of the coated polyester film, said coated polyester film comprising:

(A) a linear polyester base film; and
(B) a discontinuous film formed on at least one surface of the base film, said discontinuous film having a net-like shape and/or a node-broken net-like shape and a thickness of not larger than 500 angstroms, and being applied to said polyester base film (A) over an area which is 10 to 90% of the area of said polyester base film (A), said discontinuous base film (B) comprising:
  (i) a water-soluble polymer having a molecular weight of 10,000 to 2,000,000,
  (ii) a silicone resin having a molecular weight of 30,000 to 300,000; and
  (iii) a silane coupling reagent comprising an organic silicone monomer having in the molecule at least two different reactive groups, said reactive groups selected from those which are capable of being linked with side chain and terminal groups of the water-soluble polymer and with the side chain internal groups of the silicone resin and with the polyester.

37. A super high density magnetic recording medium, which comprises a coated polyester film and a ferromagnetic metal thin film formed on the coated surface of the coated polyester film, said coated polyester film comprising:

(A) a linear polyester base film; and
(B) a discontinuous film formed on at least one surface of the base film, said discontinuous film having a net-like shape and/or a node-broken net-like shape and a thickness of not larger than 500 angstroms, and being applied to said polyester base film (A) over an area which is 10 to 90% of the area of said polyester base film (A), said discontinuous base film (B) comprising:
  (i) a water-soluble polymer having a molecular weight of 10,000 to 2,000,000, and
  (ii) a silane coupling reagent comprising an organic silicon monomer having in the molecule at least two different reactive groups;

wherein said water-soluble polymer (i) and said silane coupling reagent (ii) have a weight ratio (i)/(ii) in the range of from 200/2 to 10/50.

38. A super high density magnetic recording medium, which comprises a coated polyester film and a ferromagnetic metal thin film formed on the coated surface of the coated polyester film, said coated polyester film comprising:

(A) a linear polyester base film; and
(B) a discontinuous film formed on at least one surface of the base film, said discontinuous film having a net-like shape and/or a node-broken net-like shape and a thickness of not larger than 500 angstroms, and being applied to said polyester base film (A) over an area which is 10 to 90% of the area of said polyester base film (A), said discontinuous base film (B) comprising:
  (i) a water-soluble polymer having a molecular weight of 10,000 to 2,000,000,
  (ii) a silicone resin having a molecular weight of 30,000 to 300,000; and
  (iii) a silane coupling reagent comprising an organic silicone monomer having in the molecule at least two different reactive groups, said reactive groups selected from those which are capable of being linked with side chain and terminal groups of the water soluble polymer and with the side chain internal groups of the silicone resin and with the polyester, wherein said water-soluble polymer (i), said silicone resin (ii) and said silane coupling reagent (iii) have a weight ratio in the range of (10–300):(10–100):(2–50).

39. A super high density magnetic recording medium, which comprises a coated polyester film and a ferromagnetic metal thin film formed on the coated surface of the coated polyester film, said coated polyester film comprising a polyester film and a discontinuous film formed on at least one surface of the polyester film, said polyester film having a surface roughness value Ra of not larger than 0.015 micron at a cut-off value of 0.08 mm as measured by a stylus-type surface roughness tester, and said discontinuous film having a net-like shape and/or a node-broken net like shape and a thickness of 50 to 500 angstroms, a short axis length of 0.05 to 10 microns, a long axis length/short axis length ratio of at least 1.7 and an area ratio of 10 to 90% and comprised of a water-soluble polymer having a molecular weight of 10,000 to 2,000,000 and a silane coupling reagent.

* * * * *

UNITED STATES PATENT AND TRADEMARK OFFICE
CERTIFICATE OF CORRECTION

PATENT NO. : 4,489,117
DATED : December 18, 1984
INVENTOR(S) : Masaaki Ono, Masahiko Motegi and Kazuo Okabe It is certified that error appears in the above-identified patent and that said Letters Patent is hereby corrected as shown below:

Column 6, line 18, delete "net-libe" and insert --net-like--.

Column 11, line 41, delete "raio" and insert --ratio--.

Column 13, line 62, delete "γ-chloropropyltrimethoxysilan" and insert --γ-chloropropyltrimethoxysilane--.

Column 15, line 16, delete "molecular" and insert --molecule--.

Signed and Sealed this

First Day of September, 1987

*Attest:*

DONALD J. QUIGG

*Attesting Officer*   *Commissioner of Patents and Trademarks*